United States Patent
Cummins et al.

(10) Patent No.: US 7,613,957 B2
(45) Date of Patent: **\*Nov. 3, 2009**

(54) VISUAL INDICATION FOR HUNG APPLICATIONS

(75) Inventors: Charles Cummins, Seattle, WA (US); Gerald F. Maffeo, Woodinville, WA (US); Lyon K. F. Wong, Issaquah, WA (US); Reiner Fink, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

This patent is subject to a terminal disclaimer.

(21) Appl. No.: 11/100,351

(22) Filed: Apr. 6, 2005

(65) Prior Publication Data

US 2006/0230324 A1    Oct. 12, 2006

(51) Int. Cl.
G06F 3/14    (2006.01)

(52) U.S. Cl. .......................... 714/57; 714/48; 715/803

(58) Field of Classification Search ................ 714/46, 714/57, 48; 715/804, 803

See application file for complete search history.

(56) References Cited

U.S. PATENT DOCUMENTS

| | | | | |
|---|---|---|---|---|
| 4,586,035 A | * | 4/1986 | Baker et al. ................. | 345/157 |
| 4,819,189 A | * | 4/1989 | Kikuchi et al. .............. | 715/797 |
| 5,363,507 A | * | 11/1994 | Nakayama et al. .......... | 715/743 |
| 5,515,493 A | * | 5/1996 | Boston et al. ............... | 715/807 |
| 5,634,002 A | | 5/1997 | Polk | |
| 5,715,386 A | * | 2/1998 | Fulton et al. .................. | 714/38 |
| 5,748,881 A | * | 5/1998 | Lewis et al. ................... | 714/47 |
| 5,748,882 A | * | 5/1998 | Huang ......................... | 714/47 |
| 5,892,511 A | * | 4/1999 | Gelsinger et al. ........... | 715/794 |
| 5,920,313 A | * | 7/1999 | Diedrichsen et al. ........ | 715/767 |
| 5,959,624 A | * | 9/1999 | Johnston et al. ............. | 715/746 |
| 6,445,400 B1 | * | 9/2002 | Maddalozzo et al. ........ | 715/803 |
| 6,453,430 B1 | | 9/2002 | Singh | |
| 6,654,915 B1 | | 11/2003 | Lu | |
| 6,670,970 B1 | * | 12/2003 | Bonura et al. ............... | 715/768 |
| 6,850,257 B1 | * | 2/2005 | Colleran et al. ............. | 715/804 |
| 2002/0093531 A1 | * | 7/2002 | Barile ......................... | 345/753 |
| 2002/0169795 A1 | * | 11/2002 | Elliott et al. ................ | 707/500 |
| 2003/0210260 A1 | * | 11/2003 | Palmer et al. ............... | 345/715 |
| 2004/0155910 A1 | * | 8/2004 | Chang et al. ................ | 345/904 |

OTHER PUBLICATIONS

Fisher, Jason, "Tired of Waiting for Windows to Termainate Hung Applications?," Windows Professional. Rochester: Apr. 2003. vol. 8, Iss. 4 p. 15.*

* cited by examiner

*Primary Examiner*—Scott T Baderman
*Assistant Examiner*—Chae Ko
(74) *Attorney, Agent, or Firm*—Shook, Hardy & Bacon LLP

(57) ABSTRACT

Methods and systems for providing a visual indication of hung applications are provided. When an application is in a hung state, an application window is replaced with a proxy window. The appearance of the proxy window is altered when a user attempts to interact with the proxy window.

20 Claims, 4 Drawing Sheets

VISUAL INDICATION FOR HUNG APPLICATIONS

FIELD OF THE INVENTION

Aspects of the present invention relate to computer operating systems. More specifically, aspects of the present invention provide a visual indication to users when a computer application does not timely interact with a computer operating system.

BACKGROUND OF THE INVENTION

It is common for computer applications and operating systems to be configured such that the computer operating systems periodically receive messages from computer applications. The messages inform the operating system that the applications are functioning properly. When an application does not transmit a message when expected, the application is considered to be "hung." An application can hang for a number of reasons, including a slow network connection, an intensive processing routine or an error condition. Users often notice that an application is hung when an application window appears, but does not allow the users to interact with an application. For example, a word processing application may periodically send messages to an operating system. When the word processing application becomes hung, the user may be allowed to move an application window, but cannot save a document, access any of the menu commands or perform any other operation that requires the word processing application to interact with the operating system.

Existing computer operating systems do not provide an indication to users when an application hangs. Users can become frustrated when trying to interact with an application window that they can see, but is non-responsive to inputs from the users. Moreover, hung applications do not provide display data to the operating system. As a result, when another application window is placed over a hung application window, the display data for the hung application window is lost and cannot be restored.

Therefore, there is a need in the art for computer operating system functionality that alerts users when an application hangs.

BRIEF SUMMARY OF THE INVENTION

Aspects of the present invention address one or more of the issues mentioned above and alert users when an application is in a hung state. When an application is in a hung state, an application window is replaced with a proxy window. The proxy window may initially have the same appearance as the application window. The appearance of the proxy window is then altered when a user attempts to interact with the proxy window. For example, the window may assume a frosted appearance.

BRIEF DESCRIPTION OF THE DRAWINGS

Aspects of the present invention are described with respect to the accompanying figures, in which like reference numerals identify like elements, and in which.

DETAILED DESCRIPTION

Exemplary Operating Environment

Figure 1:
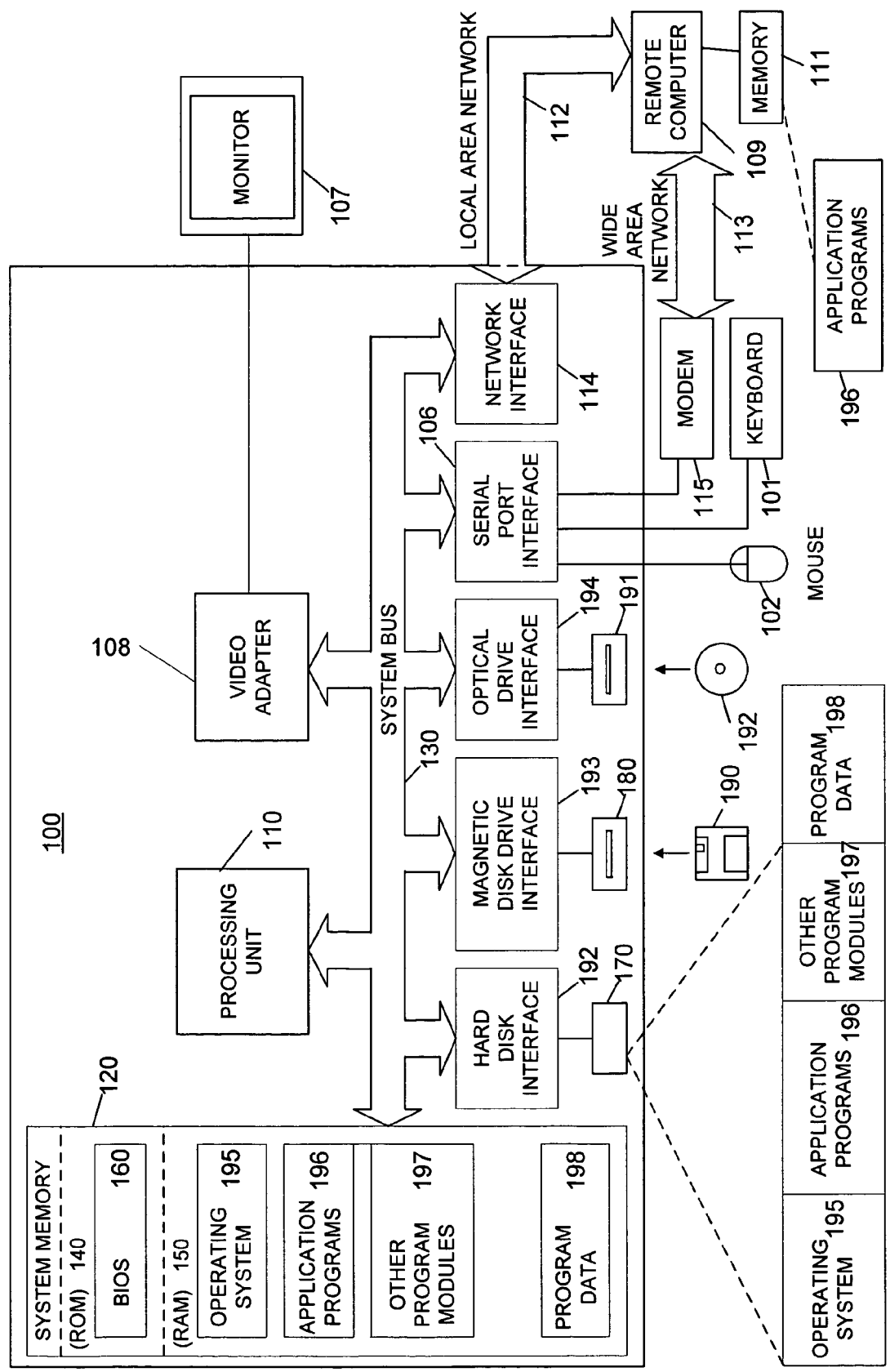
FIG. 1 shows a functional block diagram of a conventional general-purpose computer system.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Description of Illustrative Embodiments

Figure 2:
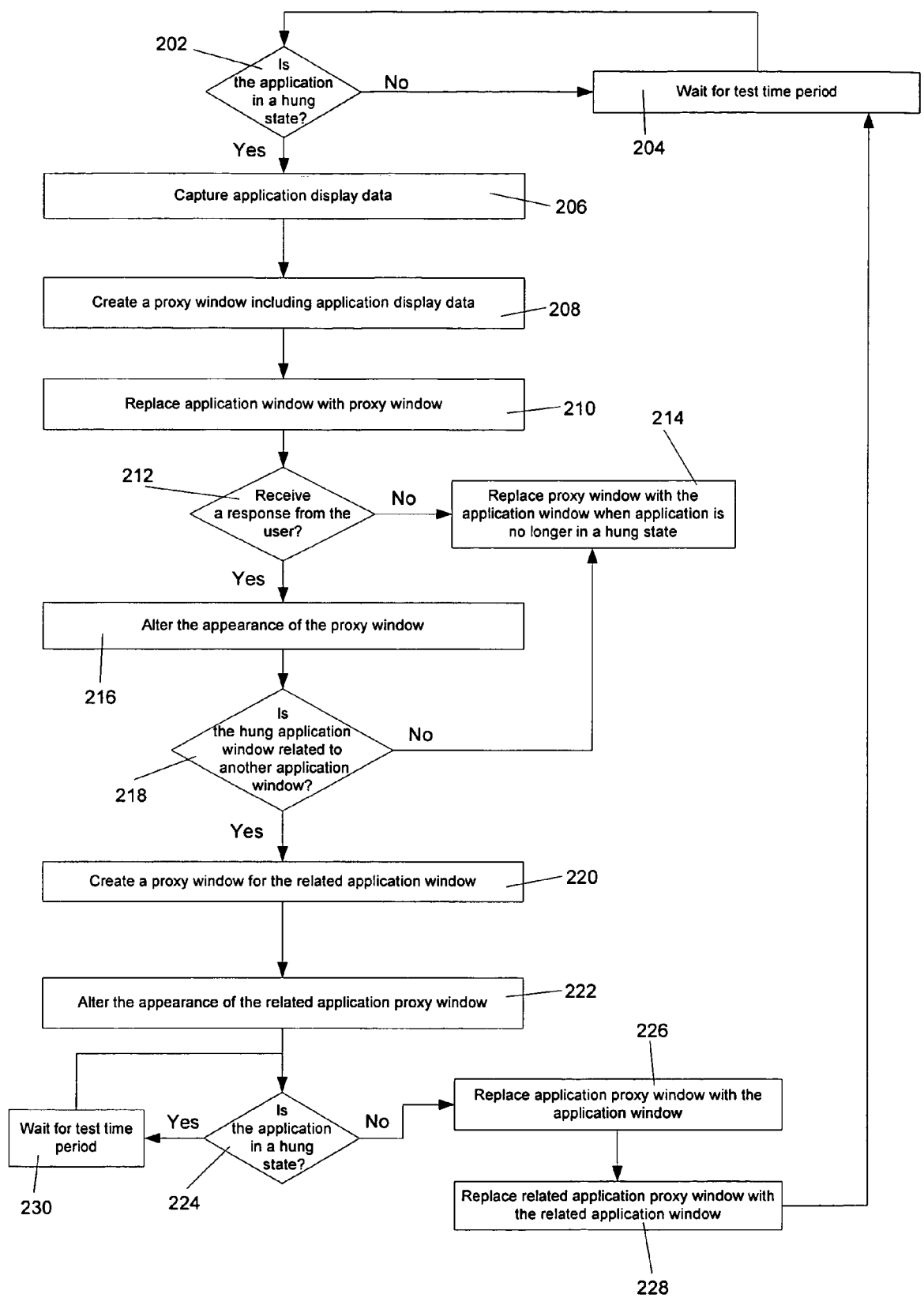
FIG. 2 illustrates a computer implemented method of alerting a user than an application is in a hung state, in accordance with an embodiment of the invention.

FIG. 2 illustrates a computer implemented method of alerting a user than an application is in a hung state. First, in step 202 it is determined whether or not an application is in a hung state. An application may be in a hung state when the application does not communicate with an operating system within a predetermined period of time. When the application is not in a hung state, in step 204 the process waits for predetermined test time before returning to step 202 and again determining whether the application is in a hung state. When the application is in a hung state, in step 206 application display data is captured. Step 206 may include capturing bitmap data that is used to create an application window that is displayed on a display device.

The method shown in FIG. 2 includes capturing application display data after it is determined that an application is in a hung state. In alternative embodiments application display data may be captured at other times. For example, a memory may store the last known good state of application display data for an application window or the memory may be updated at regular intervals.

In step 208 a proxy window that includes the application display data is created. The proxy window may have the same appearance as the application window, but does not have the same functionality as an application. For example, a proxy window may be configured to merely display information and not allow a user to interact with the window. In step 210 the application window is replaced with the proxy window. When the application window and the proxy window have the same appearance, a user may not recognize that the application window has been replaced with the proxy window.

In step 212 it is determined whether or not a response is received from a user. Step 212 may include determining whether the user has attempted to use a pointing device to select one of the menu options available on the window, attempted to input text or perform some other operation that would normally be accomplished with the application window. If no response is received from the user, in step 214 the proxy window is replaced with the application window when an application is no longer in a hung state. The combination of steps 212 and 214 may be transparent to a user. That is, if a user does not attempt to interact with the proxy window, the user would not know that an application window has been replaced with a proxy window and the proxy window is then replaced with an application window. In an alternative embodiment of the invention, the appearance of a proxy window would always be different from the appearance of an application window, regardless of whether or not a response is received from a user.

Figure 3:
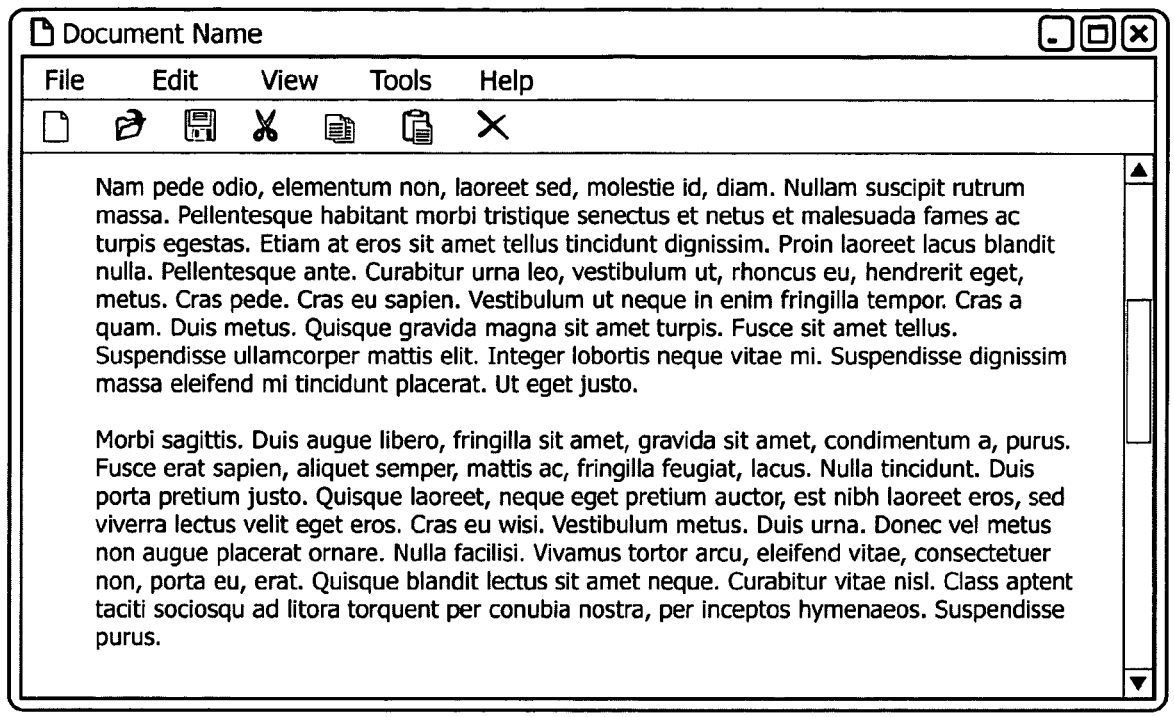
FIG. 3 illustrates an exemplary application window for a word processing application, in accordance with an embodiment of the invention.
Figure 4:
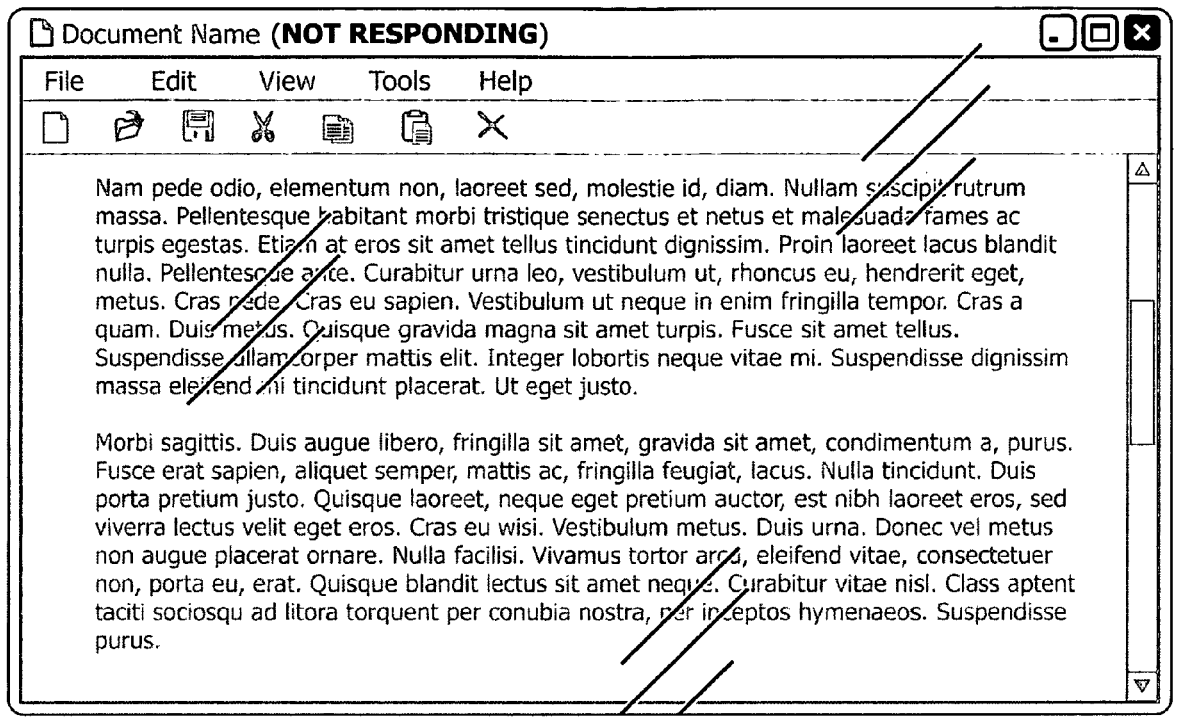
FIG. 4 illustrates a proxy window that includes a frosted appearance to alert the user that an application is in a hung state and the window is a proxy window, in accordance with an embodiment of the invention.

When a response is received from a user, in step 216 the appearance of the proxy window is altered. FIG. 3 illustrates an exemplary application window for a word processing application, in accordance with an embodiment of the invention. FIG. 4 illustrates a proxy window that includes a frosted appearance to alert the user that an application is in a hung state and the window is a proxy window. The frosted appearance may be obtained, for example, by blending a bitmap of the proxy window with a white bitmap. One skilled in the art will appreciate that there are numerous other methods of changing the appearance of a proxy window to alert the user that an application is in a hung state. For example, if the application window is normally in color, the appearance of the proxy window may be changed to black-and-white to alert the user of the hung application. In another example, one or more callers of the proxy window may be altered.

Next, is determined whether the hung application window is related to another application window in step 218. For example, an electronic-mail application window may be related to a word processing application window when a word processing application is used to compose electronic-mail messages. When the hung application window is not related to another application window, the process returns to step 214. When the hung application window is related to another application window, in step 220 a proxy window for the related application window is created. Next, the appearance of the related application proxy window may be altered in step 222. In alternative embodiments, the appearance of the related application proxy window may be altered only when a user attempts to interact with the window or with the proxy window. The appearance may be altered in the same manner that the proxy window has been altered in step 216. Alternatively, the appearances of related application windows may be altered differently to identify the windows as related application proxy windows.

After step 222, in step 224 it is again determined whether the application is in a hung state. When the application is still in a hung state, in step 230 the process waits for a test time period before again determining whether the application is in a hung state. When the application is no longer in a hung state, in step 226 the application proxy window is replaced with an application window and in step 228 the related application proxy window is replaced with a related application window. After step 228, the process returns to step 204.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer implemented method of alerting a user that an underlying application is in an unexpected hung state, the method comprising:
   (a) capturing application display data for an application window, wherein the application window corresponds with the underlying application;
   (b) determining when the underlying application is in an unexpected hung state;
   (c) when the underlying application is in the unexpected hung state, creating a proxy window that includes the captured application display data, wherein the proxy window provides an indication, by altering the appearance of the proxy window from the captured application display data, that the underlying application is in an unexpected hung state;
   (d) replacing on a display device the application window with the proxy window;
   (e) determining when a user uses an input device to interact with the proxy window; and
   (f) when the user interacts with the proxy window, altering the appearance of the proxy window.

2. The method of claim 1, wherein (a) comprises periodically capturing application display data.

3. The method of claim 1, wherein (a) comprises capturing application display data when application display data changes.

4. The method of claim 1, wherein (e) comprises determining when a user attempts to select an element of the proxy window with a pointing device.

5. The method of claim 1, wherein (f) comprises applying a frosted appearance to the proxy window.

6. The method of claim 5, wherein (f) comprises blending a bit map of the proxy window with a white bit map.

7. The method of claim 1, wherein (f) comprises displaying the contents of the proxy window in black and white.

8. The method of claim 1, wherein (f) comprises changing the color of the proxy window.

9. The method of claim 1, further comprising:
   (g) altering the appearance of the proxy window, such that the appearance of the proxy window varies from the captured application display data, after a predetermined time period has elapsed since the creation of the proxy window.

10. The method of claim 1, further comprising:
    (g) determining when the underlying application is no longer in the hung state; and
    (h) replacing the proxy window with an application window when the underlying application is no longer in the hung state.

11. The method of claim 1, wherein (b) comprises determining if the underlying application has not communicated with an operating system within a predetermined time period.

12. The method of claim 1, wherein (b) occurs prior to (a).

13. The method of claim 1, further including:
    (i) determining if the underlying application in (b) is related to another application window;
    (ii) when the underlying application in (b) is related to the another application window, replacing the related application window with a related application proxy window; and
    (iii) when the user interacts with the proxy window, altering the appearance of the related application proxy window.

14. The method of claim 13, wherein the related application window is created by the related application that is different from the underlying application in (b).

15. In a computer system having a graphical user interface including a display and a user interface selection device, a method of alerting a user that an application is in an unexpected hung state, the method comprising:
    (a) displaying on the display an application window;
    (b) replacing the application window with a proxy window when the application is in an unexpected hung state;
    (c) receiving a command indicative of the user interface selection device attempting to interact with the proxy window; and
    (d) in response to (c), altering the appearance of the proxy window such that the appearance of the proxy window varies from the captured application display data to visually indicate the application is in an unexpected hung state.

16. The method of claim 15, wherein (d) comprises applying a frosted appearance to the proxy window.

17. The method of claim 16, wherein (d) comprises blending a bit map of the proxy window with a white bit map.

18. The method of claim 15, wherein (d) comprises displaying the contents of the proxy window in black and white.

19. The method of claim 15, wherein (d) comprises changing the color of the proxy window.

20. A computer-readable medium containing computer-executable instructions for causing a computer device to perform the steps comprising:
    (a) displaying on a display an application window corresponding to an application;
    (b) capturing application display data for the application window;
    (c) determining if the application is in an unexpected hung state;
    (d) replacing the application window with a proxy window when the application is in the hung state;
    (e) when a user attempts to interact with the proxy window, changing the appearance of the proxy window, such that the appearance of the proxy window varies from the captured application display data to visually indicate the application is in an unexpected hung state;
    (f) determining when the application is no longer in the hung state; and
    (g) replacing the proxy window with an application window when the application is no longer in the hung state.

* * * * *

UNITED STATES PATENT AND TRADEMARK OFFICE
CERTIFICATE OF CORRECTION

PATENT NO.       : 7,613,957 B2
APPLICATION NO. : 11/100351
DATED            : November 3, 2009
INVENTOR(S)      : Cummins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 688 days.

Signed and Sealed this

Nineteenth Day of October, 2010

David J. Kappos
*Director of the United States Patent and Trademark Office*